G. CIAMMAICHELLA.
SAFETY BIT FOR HORSES AND OTHER ANIMALS.
APPLICATION FILED MAR. 12, 1907.

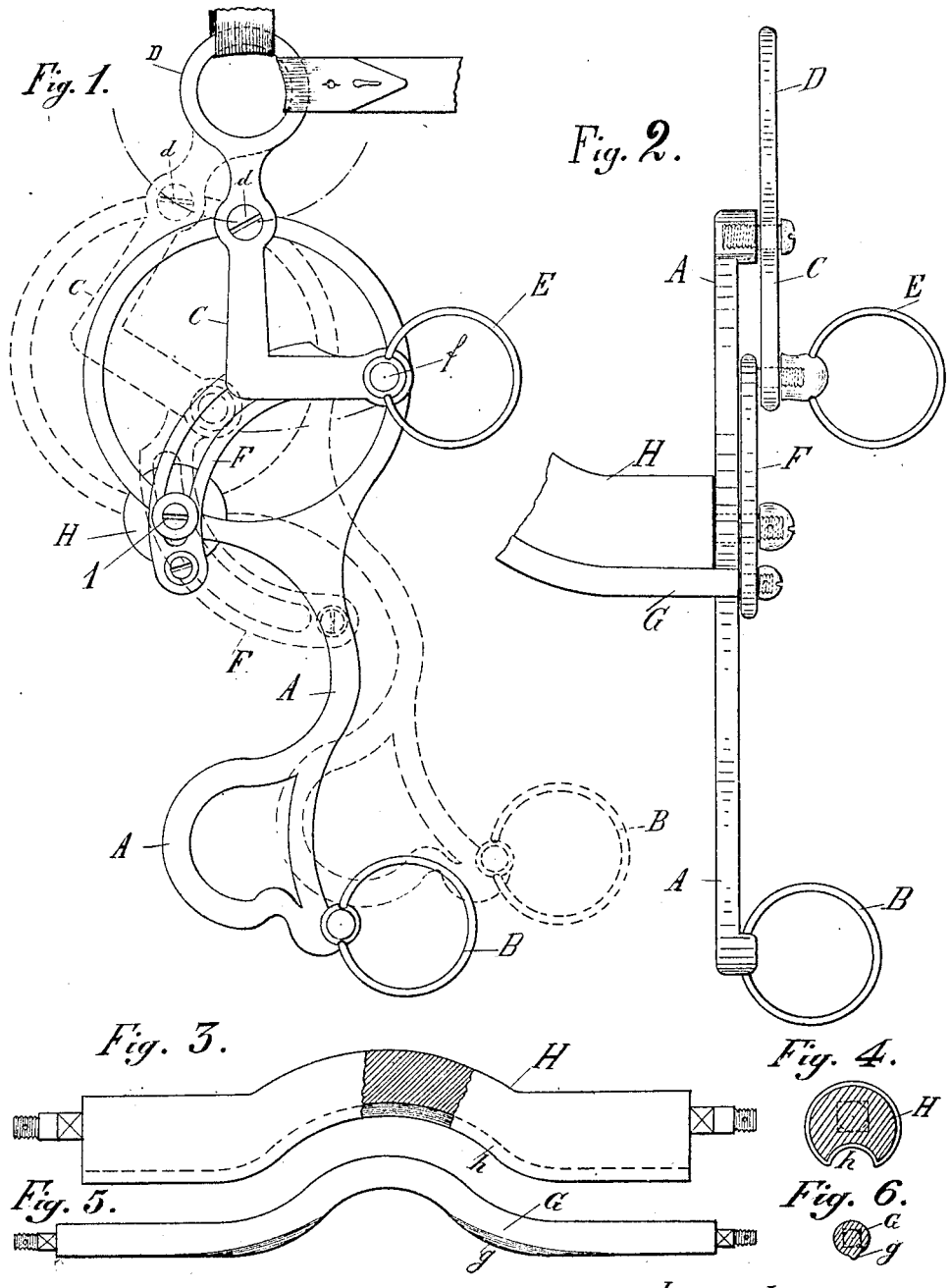
G. CIAMMAICHELLA.
SAFETY BIT FOR HORSES AND OTHER ANIMALS.
APPLICATION FILED MAR. 12, 1907.
904,682.
Patented Nov. 24, 1908.
2 SHEETS—SHEET 1.

904,682.

Patented Nov. 24, 1908.

2 SHEETS—SHEET 2.

*Fig. 7.*

Witnesses
John Edward Kelly
Leon Lanaud

Inventor
Giovanni Ciammaichella

UNITED STATES PATENT OFFICE.

GIOVANNI CIAMMAICHELLA, OF NEW YORK, N. Y.

SAFETY-BIT FOR HORSES AND OTHER ANIMALS.

No. 904,682.  Specification of Letters Patent.  Patented Nov. 24, 1908.

Application filed March 12, 1907. Serial No. 361,978.

*To all whom it may concern:*

Be it known that I, GIOVANNI CIAMMAICHELLA, subject of the King of Italy, residing at New York, in the county and State of New York, United States of America, have invented certain new and useful Improvements in Safety-Bits for Horses and other Animals, of which the following is a specification, such as will enable those skilled in the art to which my invention relates to make and use the same.

This invention relates to a bit for horses and other animals which while being easy and rapid in its action, adjustable and particularly efficacious, far from inflicting any torture upon the animal is a comfort to it and tends to keep its mouth moist and fresh.

The invention is chiefly characterized by the action of the bit upon the ramifications of the chin nerve of the lower part of the animal's mouth. To this end the bit is mainly distinguished by a light bar which is a kind of curb acting upon the bars behind the teeth to bring about the stoppage of the animal. For the purpose of insuring the proper action of this bar while affording a sufficient support to the animal's mouth, the said bar is combined with a mouth bar exerting the required pressure upon the animal's mouth and in all cases sufficient to control a quiet animal, the curb bar passing by preference into a recess made in the mouth bar so that while providing a mouth bar of a diameter large enough to act on the animal's mouth, the entire device consisting of the mouth bar and the curb bar does not occupy too much space in the mouth.

In the accompanying drawings:—Figure 1 is a side elevation of the bit in its initial position, the full lines showing the curb bar slightly moved away from a recess in the mouth bar in which it is intended to lodge and the dotted lines, the bar lowered so as to exert its action upon the bars of the animal's mouth in the region of the ramification of the chin nerves. Fig. 2 shows a front elevation of one of the cheek pieces or branches of the said bit. Figs. 3 and 4 represent the mouth bar or cannon in front elevation and in section. Figs. 5 and 6 are similar views of the curb bar. Fig. 7 represents a bit in which the curb bar has a direct action upon the corresponding portion of the bar of the mouth.

Two side cheek pieces or branches A are provided and each branch carries a lower ring B for the check reins. The upper part which is in the form of an eye or ring, has an eccentric angular lever C jointed thereto at each side at $d$ and carrying a ring D connecting the bit to the animal's headstall and serving to apply the curb, a ring E for the upper or driving reins, and an arc-shaped lever F having a guide slot and jointed at $f$ to the angular lever C and sliding upon a fixed point 1 of the ring or eye of the branch A, the said two guide levers supporting the curb bar provided on its underside with a slight edge along a portion of its length. Between the two eyes on the upper part of the branches A is held the mouth-bar H (illustrated in detail at Figs. 3 and 4) which has, on its underside, a groove $h$ in which the curb bar G can partially lodge, see Figs. 1, 3 and 4.

As shown by the full lines in Fig. 1, the apparatus, properly speaking, does not exert any action upon the animal; the curb bar G is partially located in the groove in the mouth-bar H which is in contact with the back of the mouth. To support the horse while in motion the two upper reins in the rings E must be held uniformly tight. The bottom of the slot in the arc-shaped lever F through the medium of the curb bar exerts a slight upward action upon the mouth bar so as to place it in contact with the animal's mouth. This action, however, if at the same time both the driving reins on the upper ring E be held rather loose, allows the movements of the animal to permit the arc-shaped or slotted lever to slightly oscillate and with it the curb bar, the oscillation of which is sufficient to cause salivation in the animal's mouth and so keep it moist and fresh. The thickness of the mouth bar renders the bit at this part more comfortable than any snaffle bit while affording it a most efficient support so that the bit becomes an actual assistance to horses with weak fore quarters or affected with shoulder, leg or foot complaints. To stop the animal, a uniform and gently increasing traction must be exerted on the lower or curb reins at B while loosening the upper reins at E. In consequence of the resistance offered to this movement of the lever from left to right by the contact of the mouth bar with the animal's mouth, the upper part of the branch A is compelled to move towards the left, as shown by the dotted lines, and carry with it in its movement the angular lever C and the slotted lever, which then assumes the positions indicated in dotted lines in Fig. 1, the curb bar being, in a manner, drawn along with the slotted lever against the bars of the animal's mouth, that is to say, against the ramifications of the chin nerve with a force proportionate to the degree of traction thus exerted upon the curb bar through the medium of the reins. This action exerted with the required degree suddenly substituting to the action of the curb bar that of the mouth bar will be sufficient to stop the most vicious horse without giving him pain. Recourse should be had thereto, in case of necessity, for example, when the horse tries to gain the mastery or becomes nervous. To allow the horse to again move forward it is only necessary to loose the lower reins and to act upon the upper reins at E so as to thus bring back the slotted lever with the curb bar (in their movement combined with the angular lever C) into the position shown in full lines and the curb bar in its initial contact with the mouth bar H ready to act upon the said mouth bar to place it in contact with the horse's mouth as hereinbefore stated.

Fig. 7 illustrates a bit having a direct action upon the ramifications of the chin nerve. It differs from the bit illustrated in Figs. 1 to 6 in that the action of the upper reins is wholly independent of that of the lower reins. The curb bar G' is actuated directly by a lever I at the angular end $i$ of which it is directly attached, the lever pivoting at a point on the eye or ring A' which carries at 2 the mouth bar H' and can move around the point $d'$. A pull upon the upper reins attached to the ring E will place the mouth bar in contact with the horse's mouth or keep it in contact therewith. The action of the curb bar is directly exerted as hereinbefore described by a pull upon the check reins at B. Consequently great power is available for particularly vicious horses or horses having particularly hard mouths.

Besides the advantages which have been mentioned, particularly as regards the indirectly acting curb, I would add that through the peculiar structure and arrangement of the bit it does not embarrass the animal's mouth nor strike the bars thereof, but allows the animal to run at a free and regular speed, the bit cannot be taken between its teeth, nor become displaced in the direction of traction of the reins and it prevents the horse from running away or getting beyond the control of the curb.

Having fully described my invention, what I claim as new and desire to secure by Letters Patent, is:—

1. The combination in a bridle bit, of a main mouth bar having cheek side pieces connected therewith, said bar being provided centrally with an upwardly directed loop or bend; and the bottom side thereof being provided with a longitudinal groove or recess, angle levers pivoted to the cheek side pieces, arc-shaped levers pivoted to the angle levers and provided with longitudinal slots in which the ends of the main mouth bar are movable, and a curb bar connected with said angle levers and adapted to operate in connection with the main mouth bar.

2. A bridle bit comprising a main mouth bar, side pieces connected therewith, angle levers pivoted to said side pieces arc-shaped levers pivoted to said angle levers and provided with slots in which the ends of the mouth bar are movable, and a curb bar connected with said arc-shaped levers and adapted to operate in connection with the main curb bar.

3. In a bridle bit, two side pieces, a main mouth bar, connected therewith, angle levers pivoted to the top portion of the side pieces, arc-shaped levers pivoted to the angle levers, and provided with longitudinal slots through which end members of the mouth bar pass, and a supplemental curb bar mounted in said arc-shaped levers and adapted to operate in connection with the main mouth bar.

4. A bridle bit comprising side members having head-stall attaching devices, and provided with downwardly directed shanks having rein attaching devices, a main mouth bar connected with said side members and provided centrally with an upwardly directed bend, the bottom of said bar and the bottom of said bend being provided with a longitudinal groove, and a movable curb bar supported below the main mouth bar and provided centrally with a similar upwardly directed bend, and means for throwing said curb bar into and out of the groove in the main mouth bar.

5. A bridle bit comprising circular side pieces having headstall and rein attaching devices, and provided with downwardly directed shanks having rein attaching devices, a main mouth bar connected with said circular side pieces and provided in the bottom thereof with a longitudinal groove, and centrally thereof with an upwardly directed bend, and a movable curb bar supported below the main mouth bar and provided centrally with a similar upwardly directed bend, said curb bar being adapted to be thrown into and out of the groove in the main mouth bar.

GIOVANNI CIAMMAICHELLA.

Witnesses:
JOHN EDWARD KELLY,
LÉON LANAUD.